US005793558A

United States Patent [19]
Codilian et al.

[11] Patent Number: 5,793,558
[45] Date of Patent: Aug. 11, 1998

[54] METHOD FOR SEEK TIME OPTIMIZATION EMPLOYING VOICE-COIL MOTOR CURRENT SATURATION LEVEL TO DEFINE AN ADAPTIVE DECELERATION PROFILE

[75] Inventors: Raffi Codilian, San Dimas; David Dung Tien Nguyen, Fountain Valley, both of Calif.

[73] Assignee: Western Digital Corporation, Irvine, Calif.

[21] Appl. No.: 658,345

[22] Filed: Jun. 5, 1996

[51] Int. Cl.$^6$ ............................................. G11B 5/596
[52] U.S. Cl. .................................. 360/78.06; 360/78.09
[58] Field of Search ........................ 369/44.27, 44.28, 369/32; 360/78.06, 78.07, 78.09, 78.04

[56] References Cited

U.S. PATENT DOCUMENTS

| | | | |
|---|---|---|---|
| 4,899,234 | 2/1990 | Genheimer | 360/78.06 |
| 4,914,644 | 4/1990 | Chen et al. | 369/43 |
| 5,119,250 | 6/1992 | Green et al. | 360/78.06 |
| 5,128,813 | 7/1992 | Lee | 360/78.06 |
| 5,132,855 | 7/1992 | Waugh et al. | 360/78.07 |
| 5,189,571 | 2/1993 | Murphy et al. | 360/75 |
| 5,255,253 | 10/1993 | Kagami et al. | 369/44.28 |
| 5,305,160 | 4/1994 | Funches et al. | 360/78.07 |
| 5,305,161 | 4/1994 | Giovanetti et al. | 360/78.06 |
| 5,329,409 | 7/1994 | Hampshire | 360/77.02 |
| 5,406,535 | 4/1995 | Seo et al. | 369/44.28 |
| 5,475,545 | 12/1995 | Hampshire et al. | 360/78.06 |

Primary Examiner—Nabil Hindi
Attorney, Agent, or Firm—Leo J. Young; Milad G. Shara

[57] ABSTRACT

A method and system for a disk drive that estimates demand DAC saturation current by performing a first slew with the demand DAC in saturation, and then iteratively refining the estimate in response to a sequence of slews with the demand DAC not in saturation. Each successive slew is performed with the demand DAC preloaded with an acceleration value calculated in the previous iteration. To perform each slew, the disk drive microcontroller loads the demand DAC with an acceleration value, waits a predetermined time interval, and reads servo signals to identify the track to which the head has slewed at the end of the time interval. The microcontroller then calculates the distance traveled by the actuator during the present slew and uses the ratio of this head travel distance to the head travel distance of the first (saturated) slew to refine the saturated acceleration value estimated in the previous iteration. These estimates converge over successive iterations toward the desired demand DAC saturation current.

18 Claims, 5 Drawing Sheets

METHOD FOR SEEK TIME OPTIMIZATION EMPLOYING VOICE-COIL MOTOR CURRENT SATURATION LEVEL TO DEFINE AN ADAPTIVE DECELERATION PROFILE

BACKGROUND OF THE INVENTION

1. Field of the Invention

This invention relates generally to disk drive actuator control systems and, more specifically, to such control systems that adaptively define an actuator deceleration profile in response to parameters measured during operation of the disk drive.

2. Description of the Related Art

A computer typically includes one or more hard disk drives that provide economical, nonvolatile storage for relatively large quantities of data. A typical hard disk drive includes one or more platters or disks having magnetic recording surfaces, disk drive controller electronics, one or more actuator arms on which are mounted magnetic transducer heads, an actuator motor for moving the actuator arms, and a spin motor for rotating the disks. The disk drive may also include amplifier and driver circuitry for the heads and motors, respectively. A well-known type of actuator motor is known as a voice coil motor (VCM). In response to signals received from the controller, the VCM swings an actuator arm and its transducer heads across the surface of the disk. The procedure of moving the heads to a position on the disk at which it is desired to read or write data is known as a "seek." The controller receives servo signals from certain transducer heads and uses those signals to determine the radial position of the heads on the disk. In response to this servo feedback, the controller may control the VCM in a manner that moves the heads to the desired radial position and then maintains the heads at that position. The controller stores data in concentric annular tracks on the disks by positioning the heads at radial positions corresponding to the tracks. Data are stored in sectors on each track. With the heads hovering over the target track on the spinning disks, the controller may activate the heads to record data on the disks or read data from the disks.

The controller electronics typically include a microprocessor that operates in accordance with firmware instructions. The microprocessor controls the VCM in response to read and write commands it receives from the computer. The microprocessor controls the VCM by providing data to a digital-to-analog converter (DAC), the output of which is provided to the VCM driver. This DAC is known as the demand DAC.

The VCM operates in response to current through its coil. To efficiently seek the heads from an initial track to a target track, the microprocessor increases the current provided to the VCM to accelerate the actuator as it leaves the initial track and then reverses the current provided to the VCM to decelerate the actuator as it approaches the target track. The controlled acceleration of the heads for a predetermined time is known as a "slew".

To minimize the seek time, the microprocessor should use the largest possible acceleration value and deceleration values. In other words, the microprocessor should rapidly accelerate the actuator for as long as possible before rapidly decelerating it. The microprocessor typically initially accelerates the actuator by loading the demand DAC with its maximum value. For example, the maximum binary value that can be loaded into a six-bit demand DAC is 111111. During the seek, the microprocessor uses a deceleration profile to update the demand DAC with deceleration current values in response to servo signals it receives. The deceleration profile is typically a predetermined table stored in a memory that relates the number of tracks remaining in the seek to deceleration current.

Although to accelerate the actuator the microprocessor typically loads the demand DAC with the maximum value, to decelerate the actuator the microprocessor must load the demand DAC with a value that is somewhat less than the maximum value. The demand DAC has a saturation current output below which its output current is directly proportional to its input but above which its output current remains at the saturation current level. The saturation current is dependent upon the disk drive supply voltage, VCM coil resistance, and VCM driver voltage drops and resistances. These parameters vary with manufacturing tolerances and ambient temperature. To ensure that the demand DAC operates only in its linear range, the microprocessor limits the DAC values it loads to a maximum that is significantly below the estimated saturation current, such as 80 percent of the estimated saturation current. This method wastes a portion of the linear range that would otherwise be usable, resulting in poor seek times.

It would be desirable to minimize seeks times by providing a disk drive with a system that determines the saturation current during operation and adjusts the deceleration profile to enable the microprocessor to decelerate the actuator in response to substantially the full saturation current. These problems and deficiencies are clearly felt in the art and are solved by this invention in the manner described below.

SUMMARY OF THE INVENTION

This invention is a method and system for a disk drive that estimates the saturated acceleration of a digital-to-analog converter (DAC) by performing a first seek and then iteratively refining the estimate in response to a sequence of seeks, each performed with the DAC loaded during the acceleration phase or slew portion of the seek with an acceleration value calculated in the previous iteration. A suitable programmed processor in the disk drive performs the calculations. Each seek comprises the processor reading servo signals to determine the initial track at which the heads are disposed, loading the DAC with an acceleration value, delaying a predetermined time interval, and reading servo signals to determine the track to which the heads have slewed at the end of the interval. The processor then calculates the distance that the heads traveled during the slew. As used herein, the term "slew" refers to the acceleration phase of a seek. As used herein, the term "digital-to-analog converter" (DAC) refers to any suitable device or circuit that converts a digital value into an analog signal for driving a disk drive actuator, including pulse-width modulation (PWM) circuits.

In an exemplary embodiment, a value is loaded into the DAC during the slew portion of the first seek that ensures the DAC is in saturation, and a value is loaded into the DAC during the slew portion of the second seek that ensures the DAC is not in saturation. The processor calculates an initial acceleration using the elementary physics formula: $d = \frac{1}{2}at^2$, where d is distance traveled, a is acceleration, and t is the predetermined time interval. The distance the actuator traveled during the first slew is referred to herein as the saturated distance. On each iteration thereafter, the processor refines the estimated saturated acceleration in response to the ratio of the saturated distance and the distance the actuator traveled during the slew. Nevertheless, in other embodiments the processor may refine the estimated saturated acceleration values in any other suitable manner, such as by performing a binary search between DAC values. Furthermore, although in the exemplary embodiment and in a binary search the iterative refining step causes the estimated saturated acceleration values to converge to a value between a first acceleration value in the saturation range of the DAC and a second acceleration value not in the saturation range of the DAC, in other embodiments the iterative refining step may cause the estimated saturated acceleration values to approach the saturated acceleration monotonically. In other words, the processor may calculate an estimated saturated acceleration value in response to a first slew with the DAC either in saturation or not in saturation and then either decrement or increment the DAC values, respectively, until the distances the actuator travels during successive slews change by less than a predetermined amount.

The processor may calculate the saturated acceleration in the above-described manner at any suitable time, such as during initialization of the drive prior to performing data reading and writing operations. When it is necessary to decelerate the actuator during a seek in response to a read or write request received by the disk drive, the processor may decelerate the actuator in response to the estimated saturated acceleration. This invention thus reduces seek times over those of conventional disk drives because it can apply a higher deceleration current earlier in the seek.

The foregoing, together with other features and advantages of this invention, are more apparent when referring to the following specification, claims, and accompanying drawings.

BRIEF DESCRIPTION OF THE DRAWINGS

For a more complete understanding of this invention, reference is now made to the following detailed description of the embodiments illustrated in the accompanying drawings, wherein.

DESCRIPTION OF A PREFERRED EMBODIMENT

Figure 1:
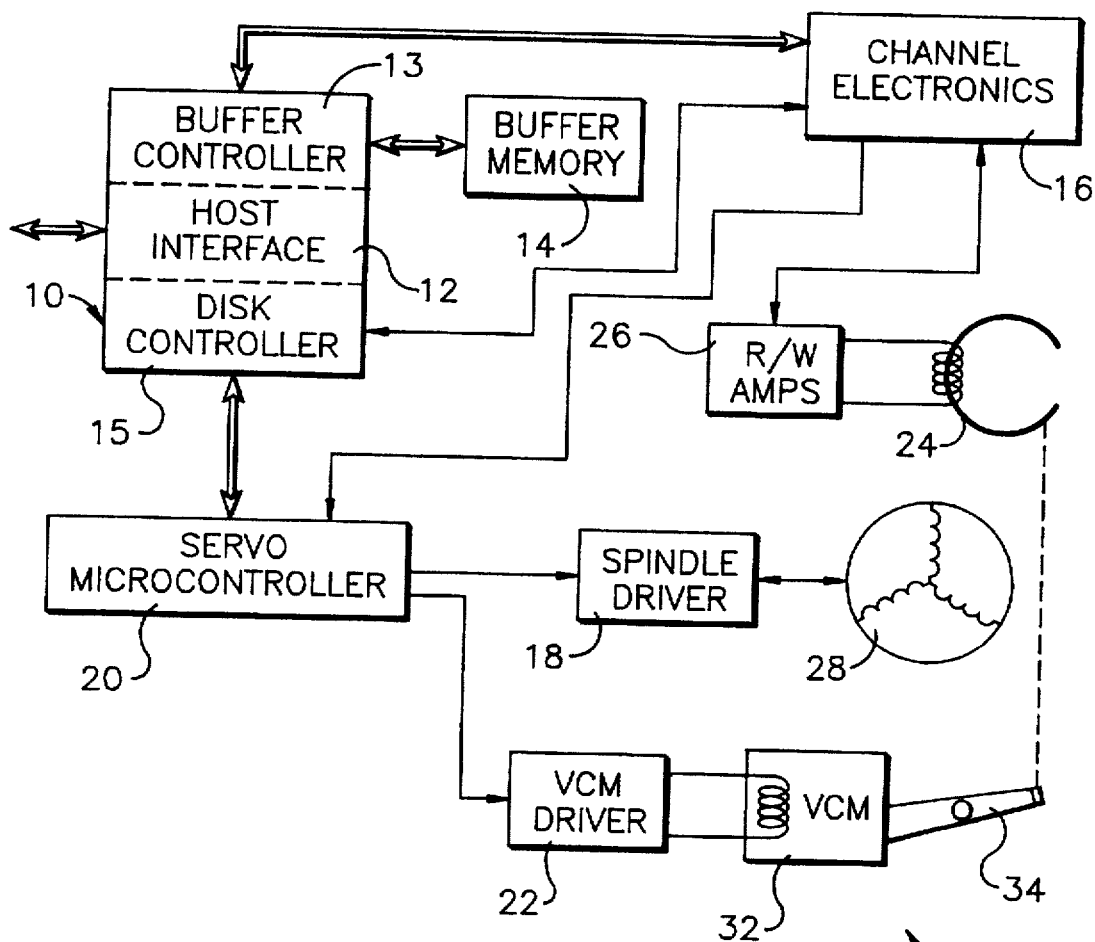
FIG. 1 is a block diagram of a disk drive.

As illustrated in FIG. 1, a disk drive includes a controller 10 having a host interface portion 12 for interfacing with a host computer (not shown), a buffer controller portion 13 for buffering data received from the host computer in a buffer memory 14, and a disk controller portion 15. The disk drive further includes channel electronics 16, a spindle motor driver 18, a servo microcontroller 20 having associated program memory, an actuator motor driver 22, a read/write head 24 and associated read/write amplifiers 26, a spindle motor 28, and an actuator 30. Actuator motor driver 22 includes an internal demand digital-to-analog converter (DAC) (not shown) that produces an acceleration current in response to a digital input value received from servo microcontroller 20. Actuator 30 includes an actuator motor 32 and an actuator arm 34 on which head 24 is mounted. Actuator motor 32 is preferably a voice coil motor (VCM). The disk drive also includes a magnetically recordable disk, which is not shown for purposes of clarity. Spindle motor 28 rotates the disk and, in response to the acceleration current generated by actuator motor driver 22, actuator arm 34 moves head 24 across the disk to access the tracks on which data are recorded.

Figure 2:
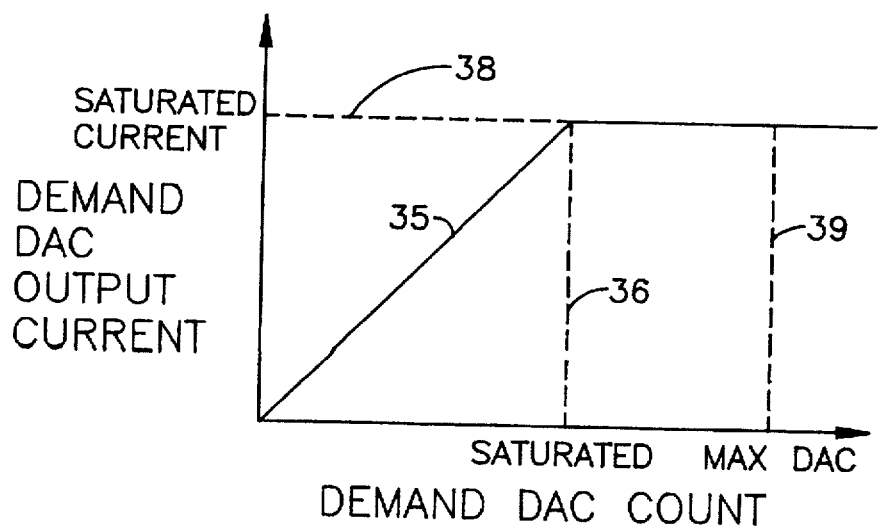
FIG. 2 is a graph illustrating the relationship between demand DAC input values and demand DAC output current.

When the computer reads or writes data, it transmits a seek command to controller 10, specifying a destination or target track. In response, microcontroller 20 loads an acceleration value into the demand DAC in actuator motor driver 22. The acceleration value is preferably the maximum acceleration value that the demand DAC is capable of receiving. For example, the maximum acceleration value is 111111 for a six-bit demand DAC. In response to the loading of the demand DAC, actuator 30 begins the slew toward the target track. As illustrated in FIG. 2, however, the current 35 that the demand DAC produces is only proportional to the input value below a certain saturated acceleration value 36. In response to any input value above saturated acceleration value 36, the output of the demand DAC is limited to the saturation current 38. Thus, at the maximum acceleration value 39 the output of the demand DAC is still the saturation current 38.

Periodically, such as each time the disk rotates one sector, servo microcontroller 20 adjusts the seek in accordance with a deceleration profile. The deceleration profile is preferably defined by an equation, which is described below, but may in other embodiments be defined by a predetermined table stored in a memory. The profile defines the deceleration current value with which servo microcontroller 20 must update the demand DAC for any given combination of head velocity and distance between the target track and the track over which head 24 is then positioned. In general, the deceleration current values are large when a large number of tracks remain in the seek and decrease as the distance to the target track decreases.

Figure 3:
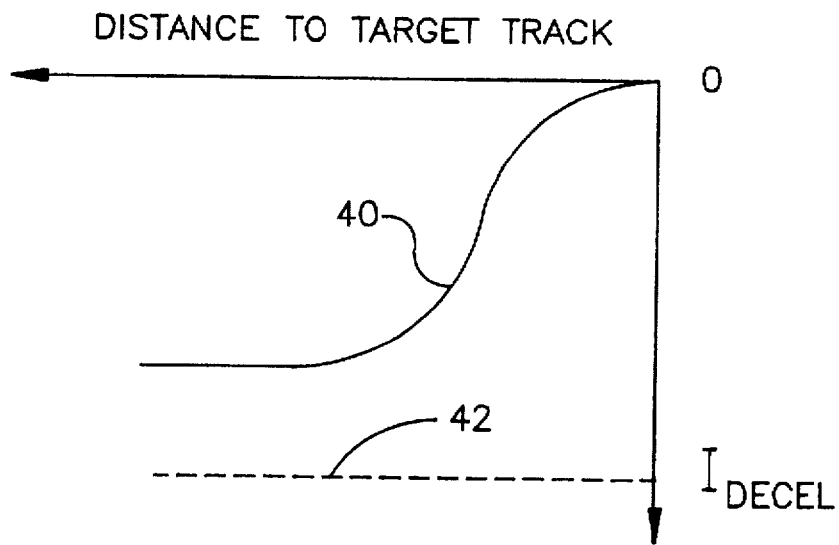
FIG. 3 is a graph illustrating a prior art deceleration profile.

In the prior art, a deceleration profile such as the generalized deceleration profile shown in FIG. 3, included a maximum deceleration current value 40 that was significantly less than the saturation current 42, typically as much as 20 percent less. Variations in ambient temperature and manufacturing tolerances prevent accurate determination of saturation current 42. Therefore, the deceleration profile had to be designed with a safety margin of, for example, 20 percent to accommodate this uncertainty.

Figure 4:
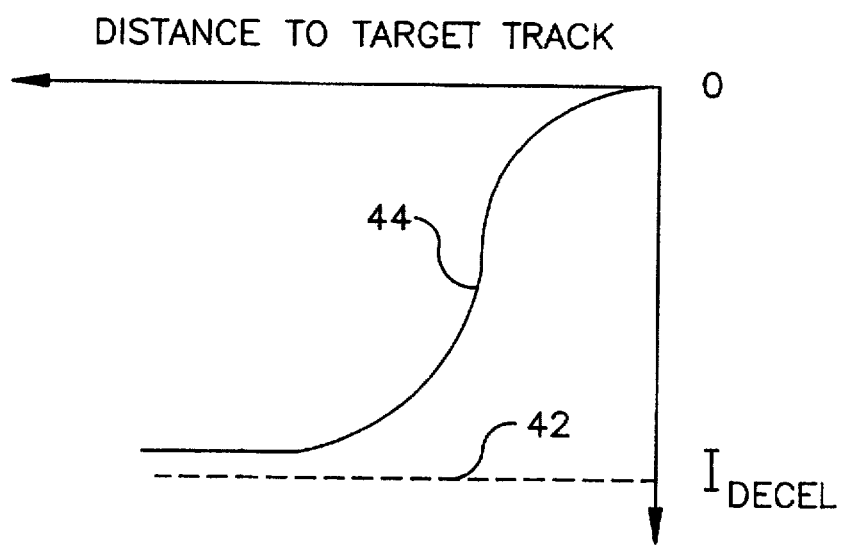
FIG. 4 is a graph illustrating an exemplary adaptive deceleration profile in accordance with this invention.

In accordance with the method of this invention described below, servo microcontroller 20 may use a deceleration profile such as that shown in FIG. 4. (The shape of this deceleration profile is generalized for clarity and is intended only to illustrate that deceleration current values 44 decrease from at or very near saturation current 42 as the distance between head 24 and the target track decreases.) It should be noted that the maximum deceleration current value 44 is much closer to saturation current 42 than in the prior art deceleration profile of FIG. 3. A large safety margin, such as 20 percent, is unnecessary because this invention adaptively adjusts the deceleration profile in response to the saturated acceleration value 36. If saturation current 42 were to change because of a change in ambient temperature, for example, the maximum deceleration current value 44 would track the change and remain correspondingly close to the new saturation current.

Servo microcontroller 20 preferably calculates saturated acceleration value 36 during an initialization period prior to beginning operation reading and writing data. Nevertheless, servo microcontroller 20 may calculate saturated acceleration value 36 at any other suitable time.

Servo microcontroller 20 is programmed with suitable software stored in a suitable memory (not shown) associated with servo microcontroller 20. The memory is preferably a non-volatile read-only memory. Therefore, the software may be referred to as firmware or microcode. The microcode relating to this invention may be integrated with microcode that controls other disk drive functions that are not the subject of this invention but that persons of skill in the art understand are conventionally included in disk drives. As a result of this programming, servo microcontroller 20 performs the novel method illustrated in FIG. 5A–B of calculating the saturated acceleration value. This method includes the step 46 of estimating a saturated acceleration value and the step 48 of iteratively refining the estimated saturated acceleration value.

To estimate the saturated acceleration value, servo microcontroller 20 initiates a first seek. At step 50 servo microcontroller 20 determines the initial track over which head 24 is positioned by reading the servo data recorded in the track. At step 52 servo microcontroller 20 initiates the seek by loading a maximum acceleration value, such as the binary value 111111, into the demand DAC. Although servo microcontroller 20 preferably loads the maximum acceleration value, it is suitable for servo microcontroller 20 to load any value that is known to be within the saturation range of the demand DAC. As a result, the demand DAC produces saturation current 38 (see FIG. 2). At step 54 servo microcontroller 20 delays a predetermined time interval t. During this time interval, head 24 is accelerating or slewing across the disk in response to saturation current 38. At step 56 servo microcontroller 20 determines the final track over which head 24 is then positioned by reading the servo date recorded on the track. At step 58 servo microcontroller 20 calculates a saturated distance, do. The saturated distance is thus the distance that head 24 traveled in response to saturation current 38 during the predetermined time interval. At step 59 servo microcontroller 20 decelerates head 24 to a stop. At step 60 servo microcontroller 20 seeks head 24 back to an initial track.

Servo microcontroller 20 then initiates a second seek. At step 62 servo microcontroller 20 initiates the seek by loading a value of one-half the maximum acceleration current value, such as the binary value 100000, into the demand DAC. Although servo microcontroller 20 preferably loads one-half the maximum acceleration value, it is suitable for servo microcontroller 20 to load any value that is known to be below the saturation range of the demand DAC. As a result, the demand DAC produces a current that is proportional to the value with which it was loaded. At step 64 servo microcontroller 20 delays the same predetermined time interval, t, as in step 54. At step 66 servo microcontroller 20 determines the track over which head 24 is then positioned by reading the servo data recorded in the track. At step 68 servo microcontroller 20 calculates a second distance, $d_1$, that head 24 traveled during the predetermined time interval. At step 70 servo microcontroller 20 calculates an the initial acceleration value, $a_1$, in accordance with the following equation:

$$a_1 = \frac{2d_1}{t^2} \qquad \text{(Eqn. 1)}$$

The above equation is the elementary physics equation that describes the motion of bodies acting under a constant acceleration. It may at first seem intuitive to simply apply the equation to the saturated distance $d_0$ to calculate saturated acceleration, but the result would not be accurate. The equation is not accurate when the demand DAC is operating in saturation because it is not in its linear range, and acceleration is thus not constant. The back electromotive force (BEMF) produced when the demand DAC is operating in saturation causes acceleration to change as a function of time (or, equivalently, velocity). Therefore, this invention iteratively refines an initial estimate of saturated acceleration. In accordance with the preferred method, this invention determines the saturated distance, calculates an initial estimate of saturated acceleration, and then iteratively refines the estimate in response to the ratios of the saturated distance to a sequence of additional distances. These additional distances are calculated by performing a sequence of additional seeks, as described below in further detail. Each seek in the sequence is performed by loading into the demand DAC the acceleration value calculated in response to a previous seek in the sequence. Although the initial estimate of saturated acceleration is very rough, having been calculated in response to a slew in which the demand DAC was not even operating in its saturation region, the iterative process quickly causes the estimate to converge toward the true saturated acceleration value 36 (see FIG. 2).

Before beginning the sequence of additional seeks to refine the estimated saturated acceleration value, at step 72 servo microcontroller 20 estimates the initial saturated acceleration value $DAC_2$ in response to the ratio of the saturated distance $d_0$ and the second distance $d_1$ in accordance with the following equation:

$$DAC_2 = DAC_1 \left( \frac{d_0}{d_1} \right) \qquad \text{(Eqn. 2)}$$

To iteratively refine the estimated saturated acceleration, servo microcontroller 20 initiates the sequence of seeks. At step 74 servo microcontroller 20 seeks head 24 back to an initial track. At step 76 servo microcontroller 20 initiates the seek by loading the estimated saturated acceleration value $DAC_2$ into the demand DAC. At step 78 servo microcontroller 20 delays the same predetermined time interval t as in steps 54 and 64. At step 80 servo microcontroller 20 reads the final track over which head 24 is then positioned by reading the servo data recorded in the track. At step 81 servo microcontroller 20 decelerates head 24 to a stop. At step 82 servo microcontroller 20 calculates a third distance $d_2$ that head 24 traveled during the predetermined time interval in response to the initial estimated saturated acceleration value $DAC_2$. At step 84 servo microcontroller 20 again adjusts the result in response to the ratio of the saturated distance $d_0$ and the third distance $d_2$ in accordance with the following equation:

$$DAC_3 = DAC_2 \left( \frac{d_0}{d_2} \right) \qquad \text{(Eqn. 3)}$$

At step 86 servo microcontroller 20 determines whether the estimated saturated acceleration value has been sufficiently refined. As noted above, the calculated values quickly converge to a value extremely close to the saturated acceleration value 36 (see FIG. 2), typically to within about two percent of it after about five or six iterations. If servo microcontroller 20 determines that the new estimated saturated acceleration value $DAC_3$ is within a predetermined amount, such as two percent, of the previous estimated saturated acceleration value $DAC_2$, then servo microcontroller 20 proceeds to step 87. At step 87 servo microcontroller 20 calculates a final estimated saturated acceleration value in accordance with the following equation:

$$a_{sat} = \frac{DAC_{n+1}}{DAC_1} * a_1 \quad \text{(Eqn. 4)}$$

Figure 5A:
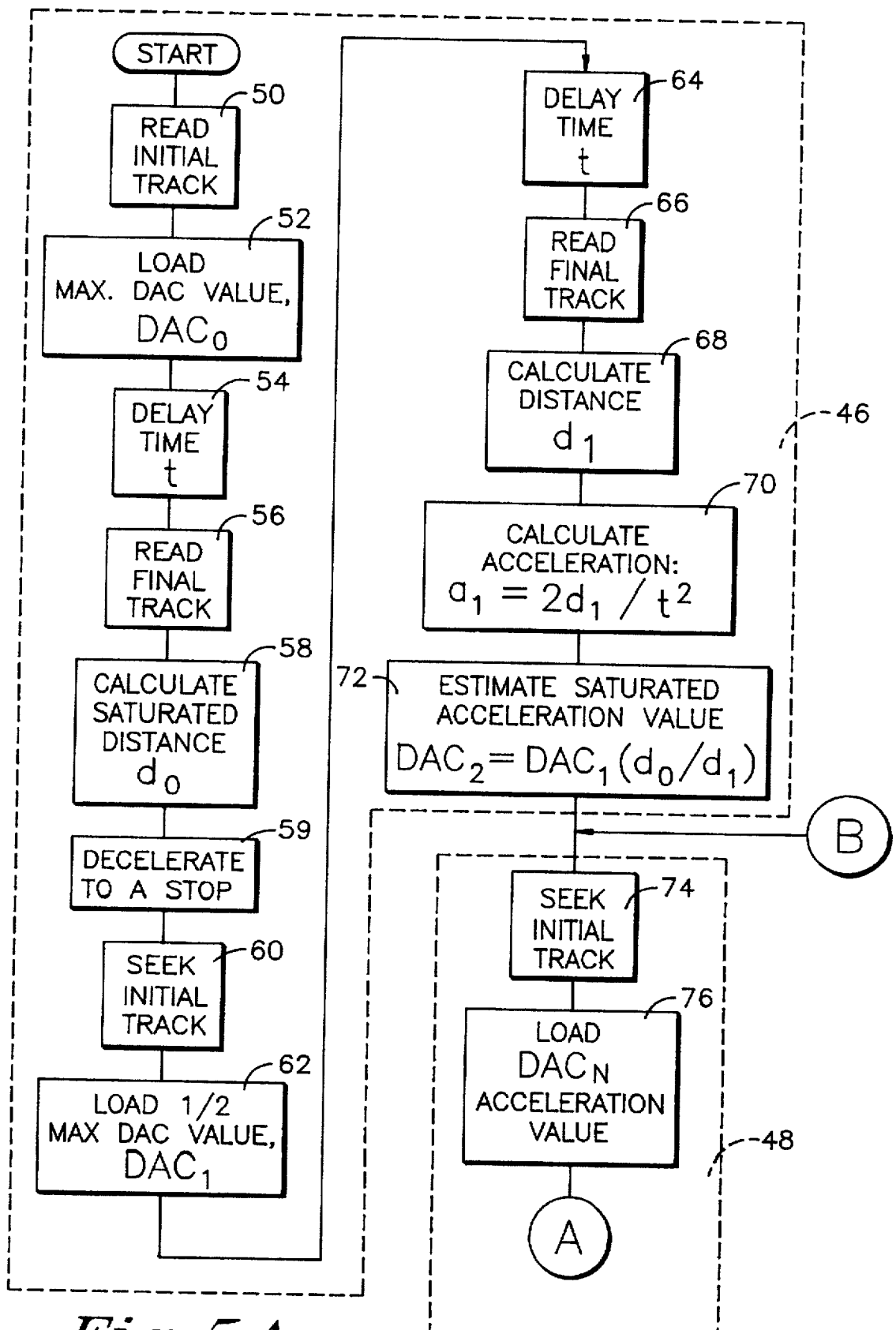
FIG. 5A–B is a flow diagram of a seek time optimization method performed by the disk drive.
Figure 5B:
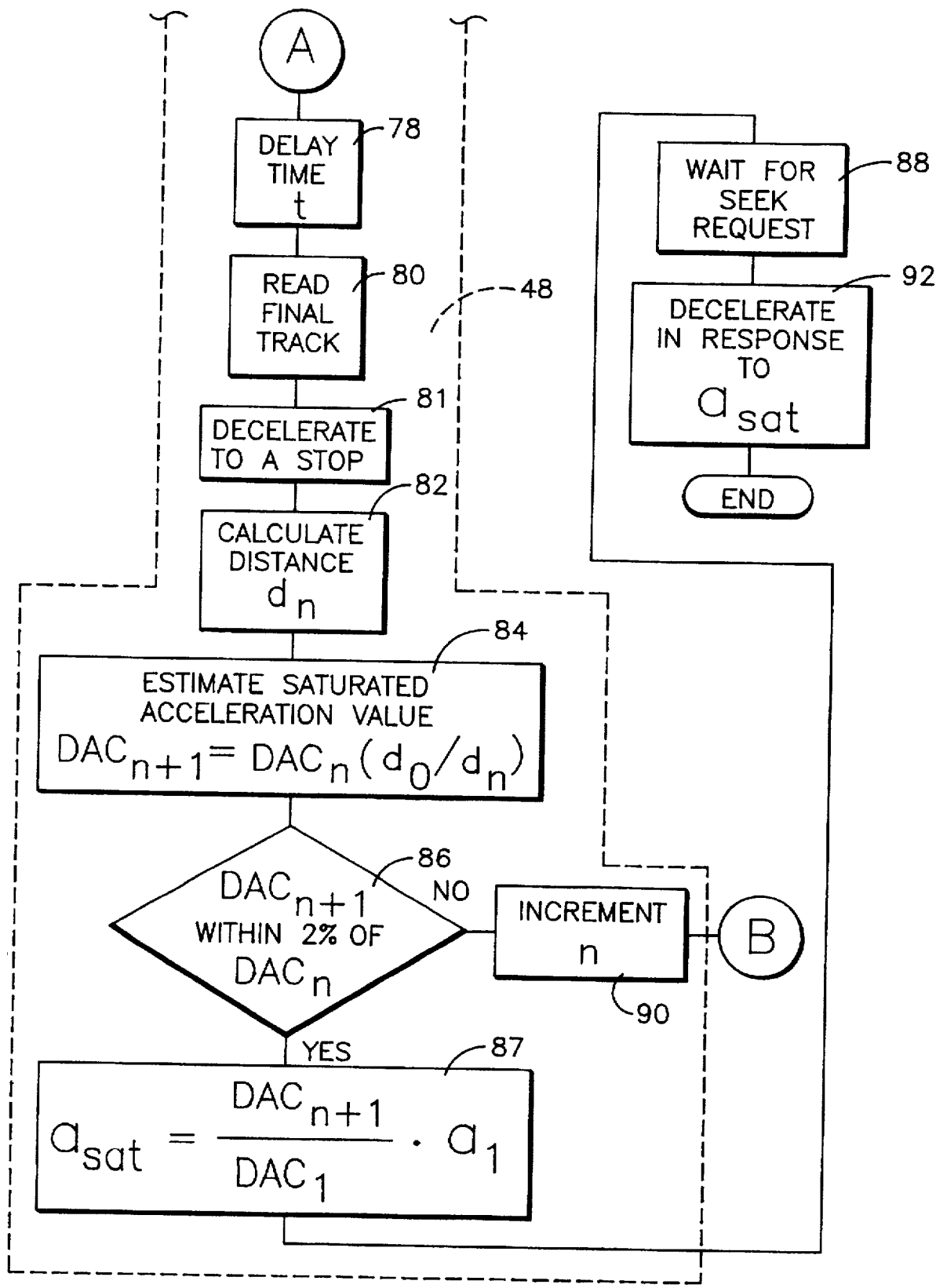

Servo microcontroller 20 may then wait at step 88 until it receives a seek command in response to a read or write operation that the disk drive receives. Although for purposes of clarity, FIG. 5A-B illustrates servo microcontroller 20 waiting at step 88, persons of skill in the art understand that servo microcontroller 20 may perform other initialization tasks of the types that are conventional in disk drives.

If servo microcontroller 20 determines at step 86 that the estimated saturated acceleration value has not been sufficiently refined, it returns to step 74 and performs another iteration. Nevertheless, step 90 illustrates servo microcontroller 20 incrementing an index number n before beginning the next iteration. The purpose of step 90 is simply to illustrate that steps 76, 84 and 86 can be generalized to reflect the nth iteration. For example, at step 76 servo microcontroller 20 may load an acceleration value $DAC_n$. Similarly, at step 84 servo microcontroller 20 may estimate an acceleration value in accordance with the following equation:

$$DAC_{n+1} = DAC_n \left( \frac{d_0}{d_n} \right) \quad \text{(Eqn. 5)}$$

During operation of the disk drive, such as while servo microcontroller 20 is waiting at step 88 or at any other suitable time, it may receive a request from the computer via buffer manager 10 to seek a certain target track at which it is requested to read or write data. In response to such a seek request, servo microcontroller 20 loads the demand DAC with a maximum acceleration value, such as a binary value of 111111. At step 92 servo microcontroller 20 then controls the deceleration of head 24 in response to the final estimated saturated acceleration value $a_{sat}$. At predetermined time intervals, such as each time the disk rotates one sector, servo microcontroller 20 determines the track over which head 24 is then positioned by reading the servo data recorded in the track. Servo microcontroller 20 also calculates the velocity of head 24 by dividing the distance that head 24 traveled in the predetermined time period, e.g., the time required for the disk to rotate one sector, by that time period. Servo microcontroller 20 then calculates a deceleration value using the following equation:

$$a_{decel} = \frac{V^2}{2x} + k \left( a_{sat} - \frac{V^2}{2x} \right) \quad \text{(Eqn. 6)}$$

In the above equation, x is the distance between the present location of head 24 and the target track, V is the calculated velocity of head 24, and k is a constant. The final estimated saturated acceleration value $a_{sat}$ is equal to the final refined estimated value of saturated acceleration calculated as described above. Servo microcontroller 20 then loads the demand DAC with the resulting deceleration value $a_{decel}$. Although the deceleration profile is preferably defined by the above equation, in other embodiments it may be defined by a predetermined table of values or by any suitable combination of equations and predetermined tables.

It can be seen from equation 6 that the deceleration current values are close or substantially equal to the saturation current early in the seek, i.e., when the distance to the target track is very large, and decrease as the distance to the target track decreases. Seek time is lower than that of conventional disk drives because the deceleration current applied early in the seek is greater, thereby decelerating the head more rapidly. This invention ensures that the deceleration current values are close to the saturation current early in the seek regardless of variations in drive supply voltage, VCM coil resistance, and VCM driver voltage drops and resistances.

Figure 6:
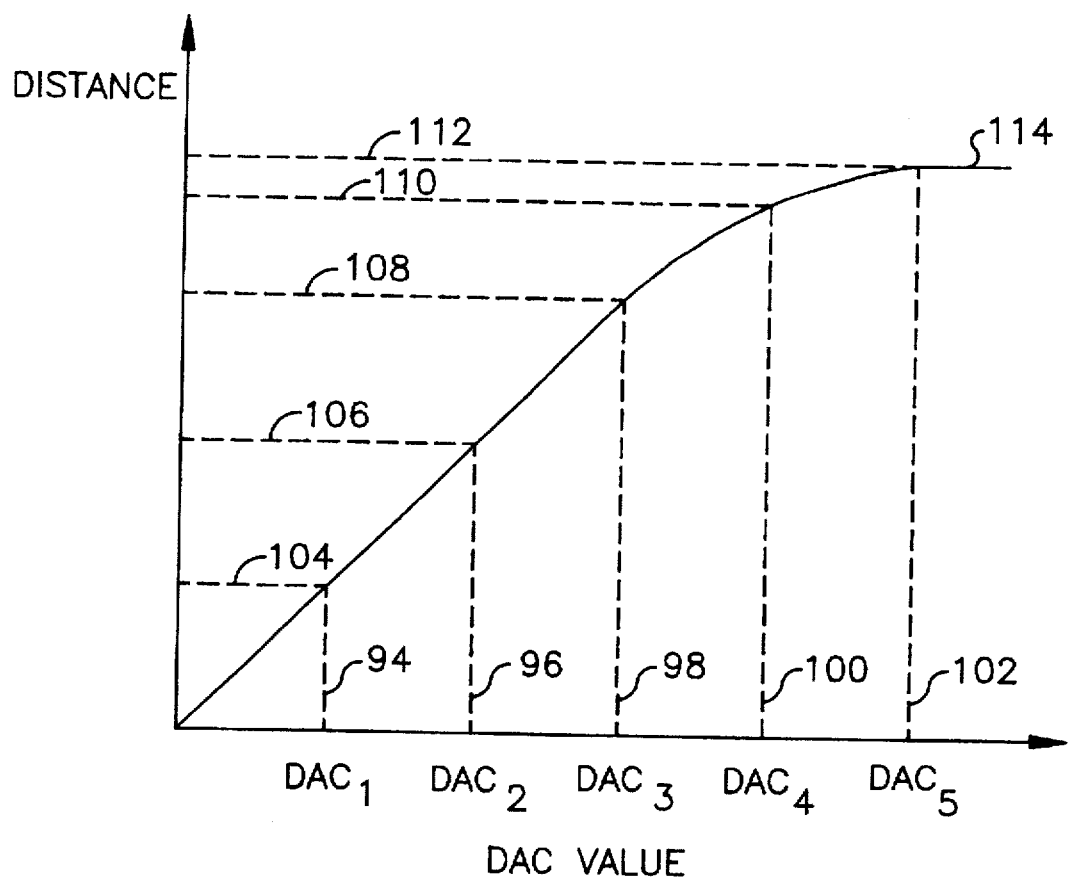
FIG. 6 is a graph illustrating convergence of distances traveled during successive seeks.

Although in the above-described embodiment the iterative refining step causes the estimated saturated acceleration values to converge to a value between a first slew with the demand DAC in saturation and the second slew with the demand DAC not in saturation, in other embodiments the iterative refining step may cause the estimated saturated acceleration values to approach the saturated acceleration monotonically. For example, as illustrated in FIG. 6, servo microcontroller 20 may calculate an estimated saturated acceleration value 94 ($DAC_1$) in response to a first slew with the demand DAC not in saturation and then increment successive estimated saturated acceleration values 96 ($DAC_2$), 98 ($DAC_3$), 100 ($DAC_4$) and 102 ($DAC_5$) until the respective distances 104, 106, 108, 110 and 112 that head 24 travels converge to distance 114. FIG. 6 also illustrates that an iterative refining step is necessary because the demand DAC produces a non-linear response at values greater than approximately value 98.

Clearly, other embodiments and modifications of this invention may occur readily to those of ordinary skill in the art in view of these teachings. Therefore, this invention is to be limited only by the following claims, which include all such other embodiments and modifications when viewed in conjunction with the above specification and accompanying drawings.

We claim:

1. A method for optimizing seek time in a disk drive having a programmed processor, a demand digital-to-analog converter (DAC), an actuator having a head moving in response to a value loaded in the DAC, and a servo system, comprising the steps of:

calculating an estimated saturated acceleration value, the step of calculating an estimated saturated acceleration value comprising the steps of:

determining a saturated distance ($d_0$) in response to a first slew at a first acceleration value ($DAC_0$) in a saturation range of the DAC;

determining a second distance ($d_1$) in response to a second slew at a second acceleration value ($DAC_1$) not in the saturation range of the DAC;

calculating an initial acceleration value ($a_1$) in response to the second distance ($d_1$) and the predetermined time interval (t); and estimating a saturated acceleration value ($DAC_2$) in response to the saturated distance ($d_0$) and the second distance ($d_1$);

iteratively refining the estimated saturated acceleration value, the step of iteratively refining the estimated saturated acceleration value comprising the steps of:

determining a refined distance ($d_n$) in response to the estimated saturated acceleration value;

calculating a refined estimated saturated acceleration value ($DAC_{n+1}$) in response to the refined distance ($d_n$), the saturated distance ($d_0$) and the estimated saturated acceleration value ($DAC_n$);

calculating a final estimated saturated acceleration value in response to the refined estimated saturated acceleration value ($DAC_{n+1}$), the second acceleration value ($DAC_1$), and the initial acceleration value ($a_1$); and loading a value substantially equal to the final estimated saturated acceleration value into the DAC to decelerate the head during a seek.

2. The method for optimizing seek time in a disk drive recited in claim 1, wherein said step of determining a saturated distance ($d_0$) in response to a first slew at an acceleration value in a saturation range of the DAC comprises the steps of:

reading from the servo system an initial track at which the head is disposed;

loading a maximum acceleration value into the DAC;

delaying the predetermined time interval (t);

reading from the servo system a final track at which the head is disposed; and calculating a saturated distance ($d_0$) between the final track and the initial track.

3. The method for optimizing seek time in a disk drive recited in claim 1, wherein said step of determining a second distance ($d_1$) in response to a second slew at an acceleration value not in the saturation range of the DAC comprises the steps of:

reading from the servo system an initial track at which the head is disposed;

loading another acceleration value less than a maximum acceleration value into the DAC;

delaying the predetermined time interval (t);

reading from the servo system a final track at which the head is disposed; and calculating a second distance ($d_1$) between the final track and the initial track.

4. The method for optimizing seek time in a disk drive recited in claim 1, wherein said step of determining a refined distance ($d_n$) in response to the estimated saturated acceleration value comprises the steps of:

reading from the servo system an initial track at which the head is disposed;

loading the estimated saturated acceleration value ($DAC_n$) into the DAC;

delaying the predetermined time interval (t);

reading from the servo system a final track at which the head is disposed; and calculating a refined distance ($d_n$) between the final track and the initial track.

5. The method for optimizing seek time in a disk drive recited in claim 1, wherein said step of calculating an initial acceleration value ($a_1$) in response to the second distance ($d_1$) and the predetermined time interval (t) is performed in accordance with the equation: $a_1 = 2d_1/t^2$.

6. The method of optimizing a seek time in a disk drive recited in claim 1, wherein said step of estimating a saturated acceleration value ($DAC_2$) in response to the saturated distance ($d_0$) and the second distance ($d_1$) is performed in accordance with the equation: $DAC_2 = DAC_1(d_0/d_1)$.

7. The method for optimizing seek time in a disk drive recited in claim 1, wherein said step of calculating a refined estimated saturated acceleration value ($DAC_{n+1}$) in response to the refined distance ($d_n$), the saturated distance ($d_0$) and the estimated saturated acceleration value ($DAC_n$) is performed in accordance with the equation: $DAC_{n+1} = DAC_n (d_0/d_1)$.

8. The method for optimizing seek time in a disk drive recited in claim 1, wherein said step of iteratively refining the estimated saturated acceleration value is performed iteratively until the refined estimated saturated acceleration value is within less than about two percent of the estimated saturated acceleration value.

9. A seek control system in a disk drive, comprising:

a digital-to-analog converter (DAC);

an actuator having a head moving in response to a value loaded in the DAC;

a servo system providing an indication of a track at which the head is disposed;

a programmed processor, including means for estimating a saturated acceleration value and means for iteratively refining the estimated saturated acceleration value;

said means for estimating a saturated acceleration value comprising:

means for determining a saturated distance ($d_0$) in response to a first slew at a first acceleration value ($DAC_0$) in a saturation range of the DAC;

means for determining a second distance ($d_1$) in response to a second slew at a second acceleration value ($DAC_1$) not in the saturation range of the DAC;

means for calculating an initial acceleration value ($a_1$) in response to the second distance ($d_1$) and the predetermined time interval (t);

means for estimating a saturated acceleration value ($DAC_2$) in response to the saturated distance ($d_0$) and the second distance ($d_1$); and said means for iteratively refining the estimated saturated acceleration value comprising:

means for determining a refined distance ($d_n$) in response to the estimated saturated acceleration value;

means for calculating a refined estimated saturated acceleration value ($DAC_{n+1}$) in response to the refined distance ($d_n$), the saturated distance ($d_0$) and the estimated saturated acceleration value ($DAC_n$); and means for calculating a final estimated saturated acceleration value in response to the refined estimated saturated acceleration value ($DAC_{n+1}$), the second acceleration value ($DAC_1$), and the initial acceleration value ($a_1$).

10. The seek control system recited in claim 9, wherein said means for determining a saturated distance ($d_0$) in response to a first slew at an acceleration value ($DAC_0$) in a saturation range of the DAC comprises:

means for reading from the servo system an initial track at which the head is disposed;

means for loading a maximum acceleration value into the DAC;

means for delaying the predetermined time interval (t);

means for reading from the servo system a final track at which the head is disposed; and means for calculating a saturated distance ($d_0$) between the final track and the initial track.

11. The seek control system recited in claim 9, wherein said means for determining a second distance ($d_1$) in response to a second slew at an acceleration value ($DAC_1$) not in the saturation range of the DAC comprises:

means for loading another acceleration value less than a maximum acceleration value into the DAC;

means for delaying the predetermined time interval (t);

means for reading from the servo system a final track at which the head is disposed; and means for calculating a second distance ($d_1$) between the final track and the initial track.

12. The seek control system recited in claim 9, wherein said means for determining a refined distance ($d_n$) in response to the estimated saturated acceleration value comprises:

means for reading from the servo system an initial track at which the head is disposed;

means for loading the estimated saturated acceleration value ($DAC_n$) into the DAC;

means for delaying the predetermined time interval (t);

means for reading from the servo system a final track at which the head is disposed; and means for calculating a refined distance ($d_n$) between the final track and the initial track.

13. The seek control system recited in claim 9, wherein said means for calculating an initial acceleration value ($a_1$) in response to the second distance ($d_1$) and the predetermined time interval (t) comprises means for solving the equation: $a_1=2d_1/t^2$.

14. The seek control system recited in claim 9, wherein said means for estimating a saturated acceleration value ($DAC_2$) in response to the saturated distance ($d_0$) and the second distance ($d_1$) comprises means for solving the equation: $DAC_2=DAC_1(d_0/d_1)$.

15. The seek control system recited in claim 9, wherein said means for calculating a refined estimated saturated acceleration value ($DAC_{n+1}$) in response to the refined distance ($d_n$), the saturated distance ($d_0$) and the estimated saturated acceleration value ($DAC_n$) comprises means for solving the equation: $DAC_{n+1}=DAC_n(d_0/d_n)$.

16. The seek control system recited in claim 9, wherein said means for iteratively refining the estimated saturated acceleration value comprises means for iteratively refining the estimated saturated acceleration value until the refined estimated saturated acceleration value is within less than about two percent of the estimated saturated acceleration value.

17. A method for optimizing seek time in a disk drive having a programmed processor, a digital register into which the processor can load variable digital values, each of the variable digital values being in an overall range including a first range having an upper bound at a first digital value and including a second range having a lower bound at the first digital value and an upper bound at a maximum digital value, an actuator, a current source responsive to the digital register to supply current to the actuator, the current source defining a relationship such that the magnitude of the current it supplies is a function of the variable digital values, with the function being substantially linear throughout the first range and being saturated at a substantially-constant current magnitude throughout the second range, the method comprising the steps of:

defining an initialization period having a start and an end, with the start of the initialization period being associated with a starting digital value and the end of the initialization period being associated with a final estimate for the first digital value;

during the initialization period, performing a sequence of seeks;

after completing each seek in the sequence:
providing data to the processor regarding the distance traveled during a fixed time interval during the immediately preceding seek;
determining from the data whether to define the final estimate for the first digital value based on data to be derived from a succeeding seek or from data previously so derived; and after the initialization period, performing a seek in which the processor loads into the digital register the final estimate for the first digital value.

18. The method for optimizing seek time in a disk drive recited in claim 17, wherein the basis for determining whether the final estimate for the first digital value is a succeeding seek or previously derived data comprises the distance traveled converging to substantially the same distance determined in a previous seek.

* * * * *